(12) United States Patent
Kwon

(10) Patent No.: US 7,337,802 B2
(45) Date of Patent: Mar. 4, 2008

(54) PRESSURE REDUCING VALVE

(75) Inventor: Sun-Dug Kwon, Cheonan-si (KR)

(73) Assignee: Novita Co., Ltd. (KR)

( * ) Notice: Subject to any disclaimer, the term of this patent is extended or adjusted under 35 U.S.C. 154(b) by 0 days.

(21) Appl. No.: 11/550,116

(22) Filed: Oct. 17, 2006

(65) Prior Publication Data

US 2007/0193638 A1 Aug. 23, 2007

(30) Foreign Application Priority Data

Feb. 17, 2006 (KR) .................. 10-2006-0015872

(51) Int. Cl.
*G05D 16/08* (2006.01)
(52) U.S. Cl. .................. 137/613; 137/505.25; 251/284
(58) Field of Classification Search ................ 137/613, 137/505.25; 251/129.15, 284
See application file for complete search history.

(56) References Cited

U.S. PATENT DOCUMENTS 4,697,619 A * 10/1987 Tiefenthaler ................ 137/613
6,675,831 B2 * 1/2004 Sakaguchi et al. ........... 137/613
6,851,447 B1 * 2/2005 Carroll ................... 137/505.25
7,080,655 B2 * 7/2006 Jacksier et al. ......... 137/505.25

FOREIGN PATENT DOCUMENTS

| KR | 200248701 | 9/2001 |
|---|---|---|
| KR | 200267751 | 2/2002 |
| KR | 1020050004538 | 1/2005 |

* cited by examiner

*Primary Examiner*—Kevin Lee
(74) *Attorney, Agent, or Firm*—Cantor Colburn LLP

(57) ABSTRACT

A pressure reducing valve applied to products such as a water purifier, a bidet, a boiler, an instant water heater, and so on is provided. The pressure reducing valve has advantages of being capable of increasing productivity and reducing manufacturing cost of products by omitting a diaphragm, a metal poppet valve, and other parts which are essential in the conventional art. In addition, it is possible to prevent leakage of fluid from a peripheral connection part of the pressure reducing valve, and damage of the connection part due to high-pressure operation of the pressure reducing valve, thereby extending the lifespan of products.

10 Claims, 5 Drawing Sheets

PRESSURE REDUCING VALVE

CROSS-REFERENCE TO RELATED APPLICATION

This application claims the benefit of Korean Patent Application No. 10-20066-0015872, filed Feb. 17, 2006, the disclosure of which is hereby incorporated herein by reference in its entirety.

BACKGROUND OF THE INVENTION

1. Field of the Invention

The present invention relates to a pressure reducing valve applied to a water purifier, a bidet, a boiler, an instant water heater, and so on, and more particularly, to a pressure reducing valve capable of preventing leakage of fluid (water) from a connection part between the pressure reducing valve and its peripheral part by improving the structure of the pressure reducing valve, and preventing damage of the connection part due to high-pressure operation of the reduction valve, thereby extending the lifespan of the product.

2. Description of the Related Art

As is well known, a pressure of water (fluid) supplied from a water faucet to a water supply line of a product such as a water purifier, a bidet, a boiler, an instant water heater may vary depending on regional characteristics or environmental conditions. Therefore, the water is irregularly supplied with a pressure of 0~15 kgf/cm$^2$.

Since the fluid is supplied through the water supply line with irregular pressure, the fluid supplied into the product from the water supply line impacts a peripheral connection part, thereby reducing the lifespan of the product as well as rendering the fluid supplied into the product inappropriate to use.

In order to solve this problem, products such as a water purifier, a bidet, a boiler, an instant water heater and the like, employ a pressure reducing valve for improving the above problems. Such pressure reducing valves are disclosed in Korean Utility Model Registration No. 20-267751 (hereinafter, referred to as a conventional art 1), Korean Utility Model Registration No. 20-248701 (hereinafter, referred to as a conventional art 2), and Korean Patent Publication No. 10-2005-4538 (hereinafter, referred to as a conventional art 3).

In the pressure reducing valves 100 of conventional art 1, 2 and 3, conventional art 1 and 2 employ a general diaphragm pressure reducing valve including components of a water inlet valve of a bidet arranged therein.

However, as shown in FIGS. 1 and 2, in the case of conventional art 1 and 2 including a housing 101 for constituting a pressure reducing valve 100, the housing 101 must include a poppet valve 102 and a diaphragm 103 inserted therein, and inlet and outlet ports for fluid, thereby complicating its shape and assembly process and increasing manufacturing cost.

In addition, as shown in FIG. 3, conventional art 3 includes a rubber diaphragm 103 expanding and contracting to determine a pressure reduction amount, thereby obviating a manufacturing process of the diaphragm 103 and the poppet valve 102. However, the diaphragm 103 is always subjected to an excessive primary pressure, which deteriorates its durability. Further, the diaphragm should be formed of a strong, reliable rubber, which drives up manufacturing cost.

That is, the pressure reducing valve should be configured to control a flow rate and a hydraulic pressure using a precisely machined poppet valve, and to pass the fluid through a narrow path. However, in order to provide such a constitution, the pressure reducing valve of conventional art 1 and 2 should have a complicated structure, and that of conventional art 3 should have an additional component such as a spring 104.

Further, the poppet valves of conventional art 1, 2 and 3 are formed of a metal material having good cutting performance and strength, which may also increase manufacturing cost.

Furthermore, when the fluid supplied with irregular pressure impacts the peripheral connection part of the conventional pressure reducing valves, the peripheral connection part becomes less effective in preventing leakage of fluid from the connection part due to the impact.

SUMMARY OF THE INVENTION

In order to solve the foregoing and/or other problems, it is an aspect of the present invention to provide a pressure reducing valve capable of preventing leakage of fluid (water) from a connection part between the pressure reducing valve and its peripheral part by improving the structure of the pressure reducing valve and preventing damage of the connection part due to high-pressure operation of the reduction valve, thereby extending the lifespan of products employing the pressure reducing valve.

Additional aspects and advantages of the present invention will be set forth in part in the description which follows and, in part, will be obvious from the description, or may be learned by practice of the invention.

The foregoing and/or other aspects of the present invention may be achieved by providing a pressure reducing valve including: a valve main body having a water inlet port, a water outlet port, and a pressure chamber disposed adjacent to the water outlet port; a poppet valve having an inner flow path installed in the valve main body to connect the water inlet port and the water outlet port, and moving to adjust an introduction flow rate of fluid through the water inlet port; a pressure/flow rate control member disposed at an outer periphery of the poppet valve, and expanding and contracting depending on movement of the poppet valve; a solenoid engaged with the exterior of the water outlet port of the valve main body, and controlling opening/closing of the water outlet port; and a movement control member installed at one end of the valve main body and controlling a movement range of the poppet valve depending on opening of the water inlet port.

In some exemplary embodiments of the present invention, the movement control member may be a stopper disposed adjacent to the water outlet port in the pressure chamber.

In other exemplary embodiments, the water inlet port may have a diameter equal to or smaller than that of the water outlet port.

In still other exemplary embodiments, the water outlet port may have a cross-sectional area within a predetermined range with respect to the inner flow path.

In yet other exemplary embodiments, the poppet valve disposed in the pressure chamber may have an engraved semi-circular shape at its one surface to rapidly react to transmitted pressure.

In yet other exemplary embodiments, the pressure/flow rate control member may be disposed in a spring chamber sealed by O-rings provided around both ends of the poppet valves.

In yet other exemplary embodiments, the pressure/flow rate control member may be a coil spring.

In yet other exemplary embodiments, the spring chamber may further include a vacuum release member for preventing decrease of mobility of the poppet valve due to a vacuum state.

In yet other exemplary embodiments, the vacuum release member may be a first communication hole formed in the valve main body positioned in the spring chamber.

In yet other exemplary embodiments, the vacuum release member may be a second communication hole formed in one end of the poppet valve for communication between the spring chamber and the pressure chamber.

In yet other exemplary embodiments, the O-ring may be engaged around only one end of the poppet valve to release the vacuum state of the spring chamber by connecting the water inlet port and the spring chamber, or the spring chamber and the pressure chamber.

BRIEF DESCRIPTION OF THE DRAWINGS

These and/or other aspects and advantages of the present invention will become apparent and more readily appreciated from the following description of exemplary embodiments, taken in conjunction with the accompanying drawings of which.

DETAILED DESCRIPTION OF THE INVENTION

Reference will now be made in detail to exemplary embodiments of the present invention which are illustrated in the accompanying drawings.

Figure 1:
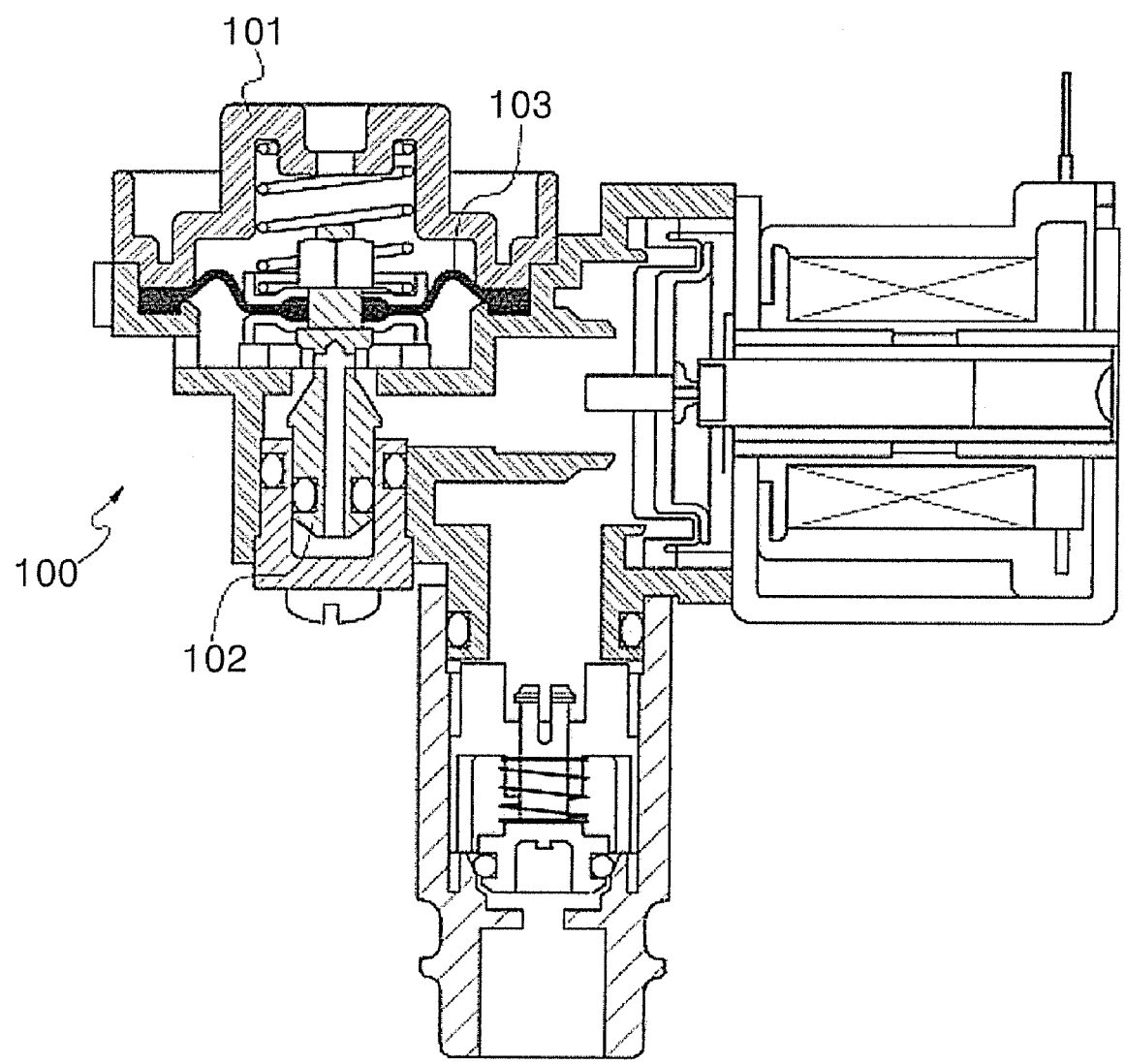
FIG. 1 is a cross-sectional view of a conventional pressure reducing valve.
Figure 2:
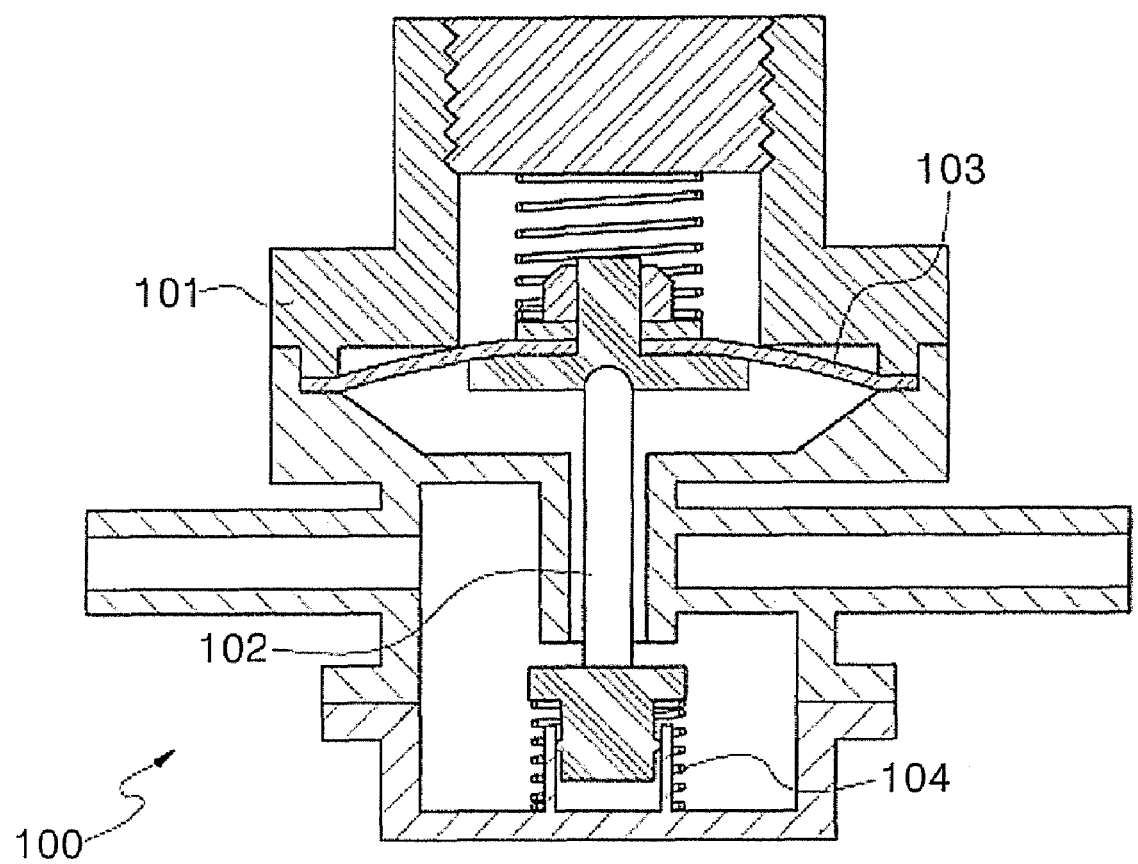
FIG. 2 is a cross-sectional view of another conventional pressure reducing valve.
Figure 3:
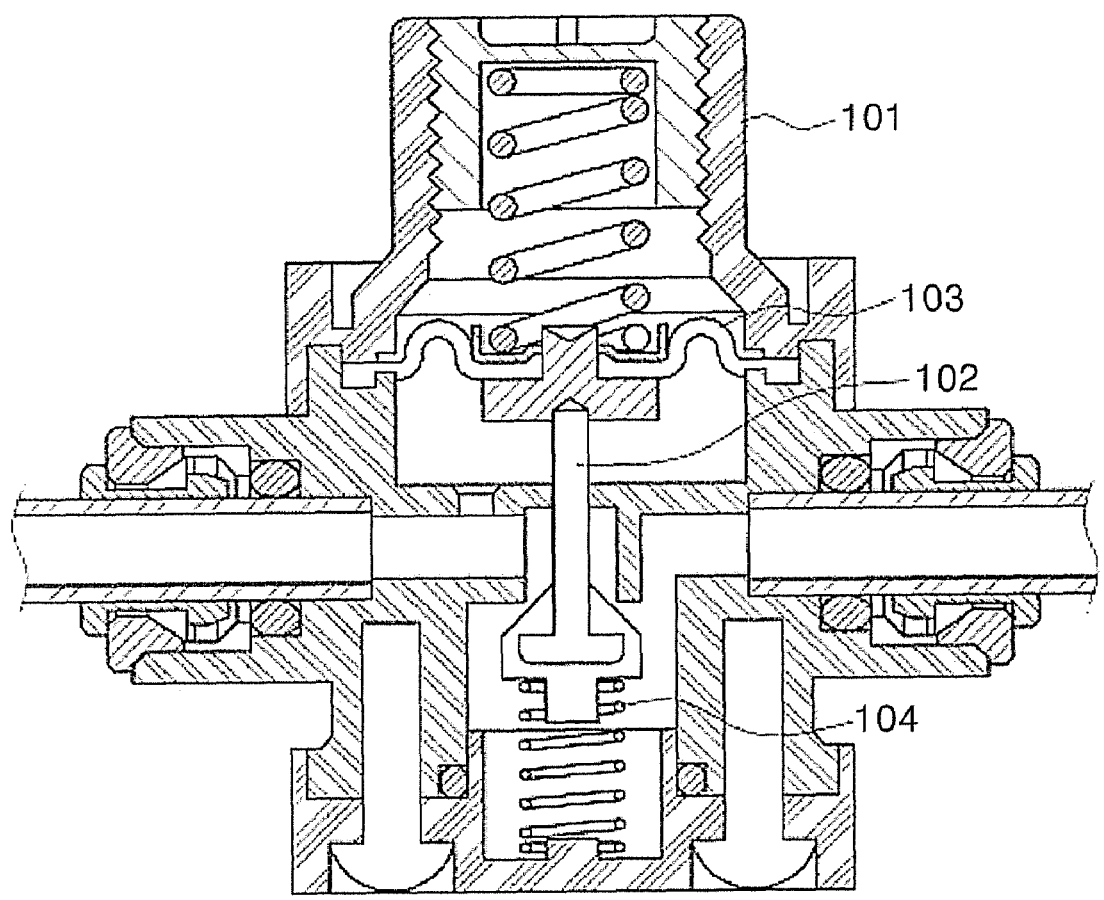
FIG. 3 is a cross-sectional view of still another conventional pressure reducing valve.
Figure 4:
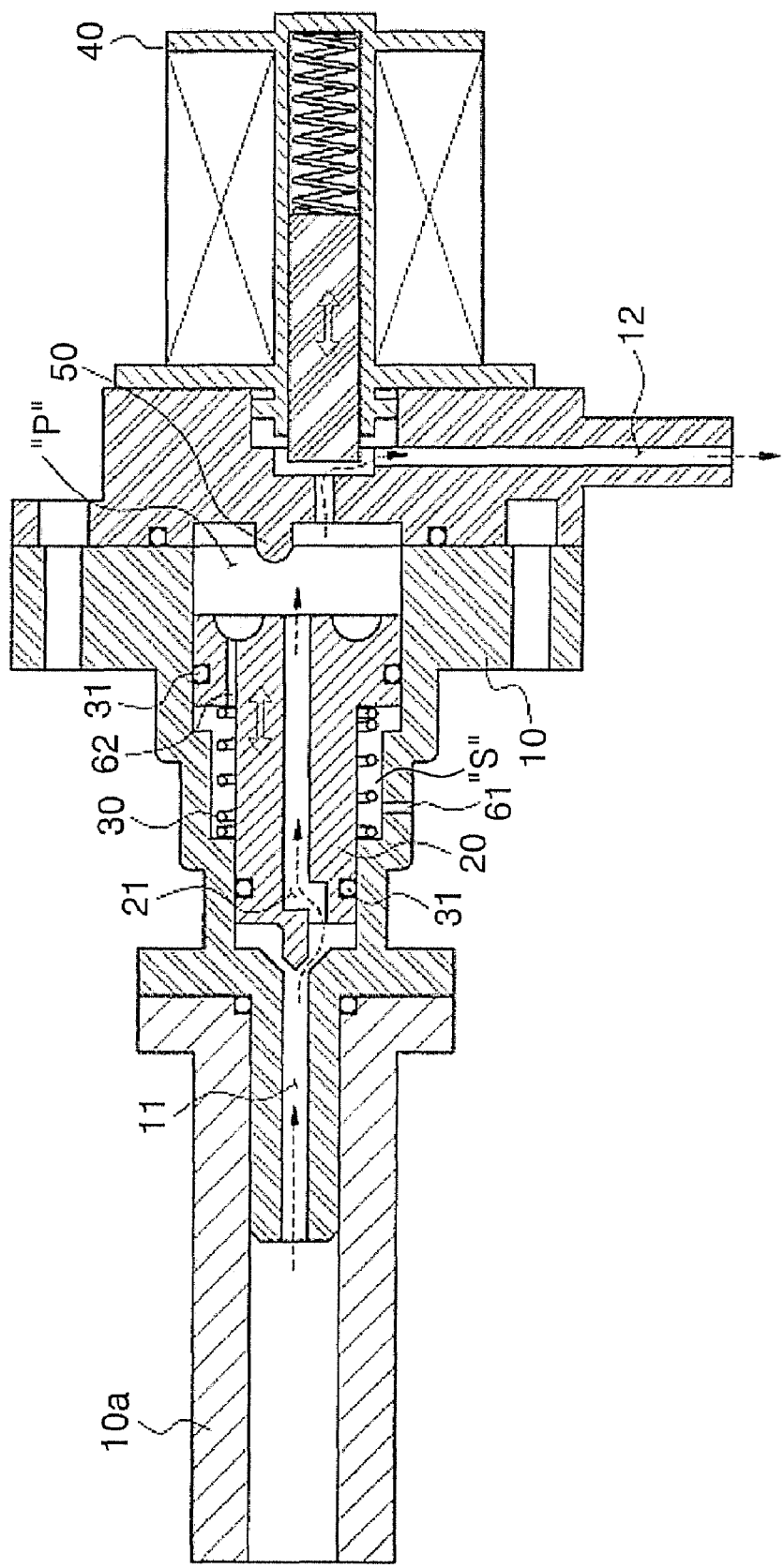
FIG. 4 is a cross-sectional view of a pressure reducing valve in accordance with an exemplary embodiment of the present invention.
Figure 5:
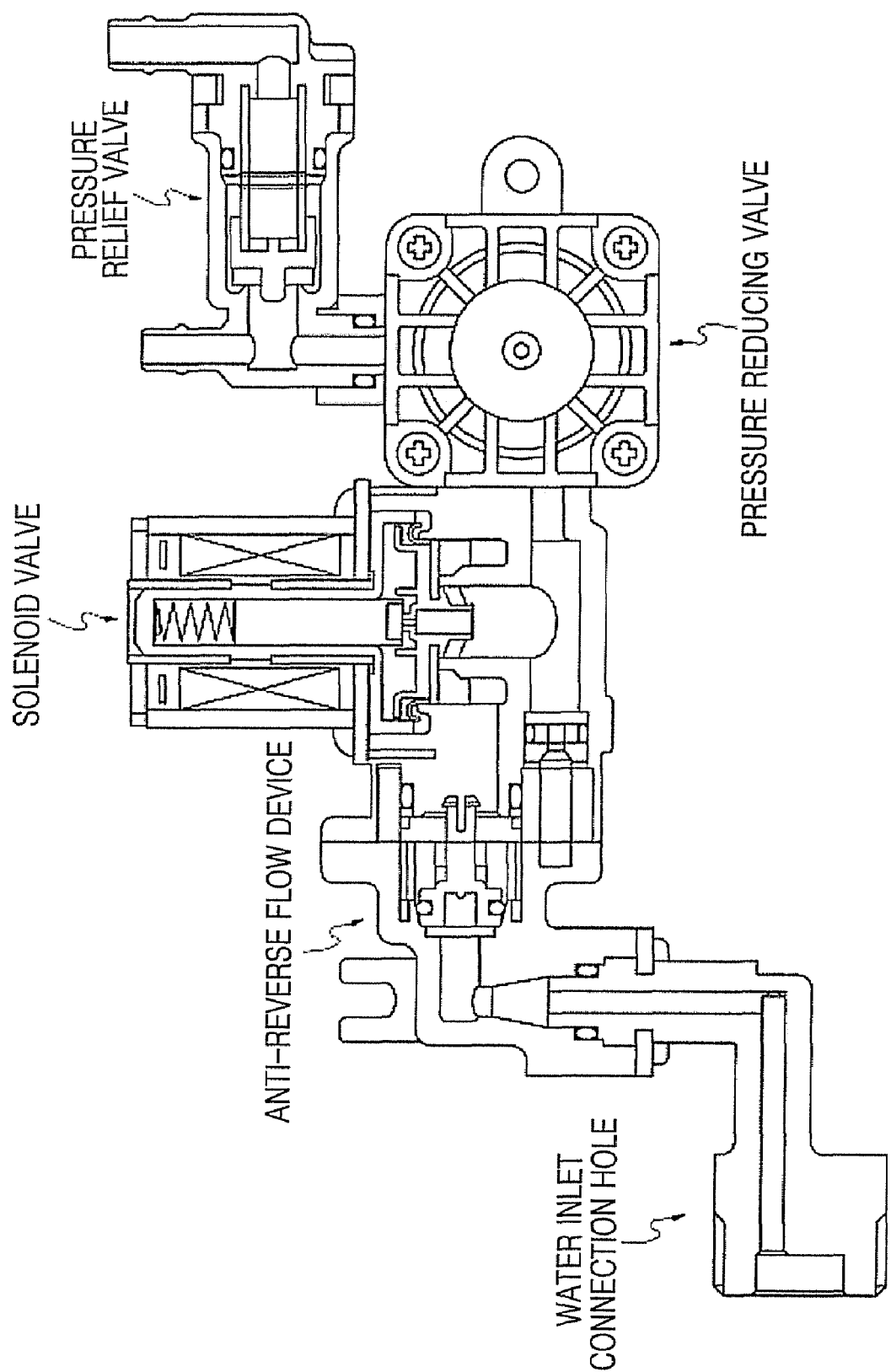
FIG. 5 is a schematic plan view of a pressure reducing valve in accordance with an exemplary embodiment of the present invention which is adapted to a water inlet valve of a bidet.

FIG. 4 is a cross-sectional view of a pressure reducing valve in accordance with an exemplary embodiment of the present invention, and FIG. 5 is a schematic plan view of a pressure reducing valve in accordance with an exemplary embodiment of the present invention which is adapted to a water inlet valve of a bidet.

Referring to FIG. 4, a pressure reducing valve in accordance with an exemplary embodiment of the present invention includes a valve main body 10, a poppet valve 20, a pressure/flow rate control member 30, a solenoid 40, and a movement control member 50.

The valve main body 10 includes a water inlet port 10 connected to a water inlet connection hole 10a of a water faucet, and a water outlet port 12 connected to the solenoid 40. And, a pressure chamber P provided by the poppet valve 20 is formed in the valve main body 10.

The water inlet port 11 may have a diameter equal to or smaller than that of the water outlet port 12 such that operational performance of the poppet valve 20 can be improved.

The poppet valve 20, installed in the valve main body 10 to adjust an introduction flow rate of the fluid, is moved toward the water outlet port 12 by the pressure/flow rate control member 30, or is moved to the water inlet port 11 by the pressure of the pressure chamber P. An inner flow path 21 is configured to connect the water inlet port 11 and the water outlet port 12.

The poppet valve 20 disposed in the pressure chamber P has an engraved semi-circular shape at its one surface to rapidly react to pressure transmitted from the pressure chamber P.

In addition, the water outlet port 12 has a cross-sectional area within a predetermined range with respect to the inner flow path 21, i.e., about 1.5 times the cross-sectional area of the inner flow path 21.

The pressure/flow rate control member 30 is a coil spring disposed around the outer periphery of the poppet valve 20 and extending or compressing depending on movement of the poppet valve 20.

The coil spring may be disposed in a spring chamber S hermetically sealed by O-rings 31 installed at both ends of the poppet valve 20. However, the spring chamber S may have a vacuum release member to prevent decrease in mobility of the poppet valve 20 due to vacuum suction.

That is, the vacuum release member may be a first communication hole 61 formed at the valve main body 10, in which the spring chamber S is disposed, or a second communication hole 62 formed at one end of the poppet valve 20 to connect the spring chamber S and the pressure chamber P. Preferably, the vacuum release member is the first communication hole 61 constituting the spring chamber S hermetically sealed by the O-rings 31 at its both ends.

The second communication hole 62 is designed in consideration of leakage which could be generated when the first communication hole 61 is adapted.

Meanwhile, in another exemplary embodiment of the present invention, the O-ring 31 may be installed at only one end of the poppet valve 20 to release the vacuum state of the spring chamber by connecting the water inlet port 11 and the spring chamber S, or the spring chamber S and the pressure chamber P. However, with such a constitution, it is difficult to finely control the pressure. Therefore, in an embodiment of the present invention, only the spring chamber S sealed by a plurality of O-rings 31 will be described.

The solenoid 40, driven to control opening/closing of the water outlet port 12, is engaged with an outer part of the water outlet port 12 of the valve main body 10.

The movement control member 50 is a stopper projecting inward from one end of the valve main body 10 for limiting a movement range of the poppet valve 20 depending on opening of the water inlet port 11.

Operation of the above exemplary embodiment of the present invention will be described below with reference to FIGS. 4 and 5.

First, when the solenoid 40 is driven to open the water outlet port 12, a predetermined amount of fluid is introduced into the valve main body 10 through the water inlet port 11 of the valve main body 10 connected to the water inlet connection hole 10a of the water faucet.

At this time, the poppet valve 20 blocking the water inlet port 11 using its front end is moved toward the water outlet port 12 by the introduced fluid and the resilient force of the coil spring, i.e., the pressure/flow rate control member 30 formed around the poppet valve 20.

As the front end of the poppet valve 20 retracts farther from the water inlet port 11, the water inlet port opens widely.

In this process, movement of the poppet valve 20 toward the water outlet port 12 is stopped by the stopper, i.e., the movement control member 50 formed at one end of the valve main body 10, in order to prevent transmission of excessive pressure to the product (such as the bidet shown in FIG. 5) due to excessive opening of the water inlet port 11.

As a result of the opening of the water inlet port 11, the fluid introduced into the valve main body 10 arrives at the pressure chamber P through the inner flow path 21 of the poppet valve 20, and then is discharged into a purifying filter and a sterilization filter of the bidet through the water outlet port 12 opened simultaneously upon the fluid's arrival at the pressure chamber P.

At this time, the fluid, not discharged through the water outlet port 12, increases the pressure in the pressure chamber P, and the increased pressure overcomes the resilient force of the coil spring, i.e., the pressure/flow rate control member 30 in the spring chamber S sealed by the O-rings 31 at its both ends, thereby pushing the poppet valve 20 toward the water inlet port 11.

As a result, the front end of the poppet valve 20 narrows the opened area of the water inlet port 11 to appropriately control a pressure and a flow rate of the fluid.

That is, the water inlet port 11 has a diameter equal to or smaller than that of the water outlet port 12, and the water outlet port 12 has a cross-sectional area no more than 1.5 times the cross-sectional area of the inner flow path 21 of the poppet valve 20.

When the fluid is introduced into the water inlet port 11 or discharged through the water outlet port 12 to generate a predetermined pressure in the pressure chamber P, the poppet valve 20 can smoothly move toward the water inlet port 11 or the water outlet port 12. Of course, there is no pressure loss in the pressure chamber P, and it is possible to appropriately adjust the pressure and flow rate of the fluid using the pressure reducing valve.

As can be seen from the foregoing, a pressure reducing valve of the present invention, applied to products such as a water purifier, a bidet, a boiler, an instant water heater, and so on, has advantages of being able to increase productivity and reduce manufacturing cost of the product by omitting a diaphragm, a metal poppet valve, and the other parts, which are essential in the conventional art. In addition, it is possible to prevent leakage of fluid from a peripheral connection part of the pressure reducing valve, and damage of the connection part due to high-pressure operation of the pressure reducing valve, thereby extending the lifespan of products.

Although a few exemplary embodiments of the present invention have been shown and described, it will be appreciated by those skilled in the art that changes may be made in these embodiments without departing from the principles and spirit of the invention, the scope of which is defined by the appended claims and their equivalents.

What is claimed is:

1. A pressure reducing valve comprising:
    a valve main body having a water inlet port, a water outlet port, and a pressure chamber disposed adjacent to the water outlet port;
    a poppet valve having an inner flow path installed in the valve main body to connect the water inlet port and the water outlet port, and moving to adjust an introduction flow rate of fluid through the water inlet port;
    a pressure/flow rate control member disposed at an outer periphery of the poppet valve, and expanding and contracting depending on movement of the poppet valve;
    a solenoid engaged with the exterior of the water outlet port of the valve main body, and controlling opening/closing of the water outlet port; and
    a movement control member installed at one end of the valve main body and controlling a movement range of the poppet valve depending on opening of the water inlet port.

2. The pressure reducing valve according to claim 1, wherein the movement control member is a stopper disposed adjacent to the water outlet port in the pressure chamber.

3. The pressure reducing valve according to claim 1, wherein the water inlet port has a diameter equal to or smaller than that of the water outlet port.

4. The pressure reducing valve according to claim 1, wherein the water outlet port has a cross-sectional area within a predetermined range with respect to the inner flow path.

5. The pressure reducing valve according to claim 1, wherein the poppet valve disposed in the pressure chamber has an engraved semi-circular shape at its one surface to rapidly react to transmitted pressure.

6. The pressure reducing valve according to claim 1, wherein the pressure/flow rate control member is disposed in a spring chamber sealed by O-rings provided around both ends of the poppet valves.

7. The pressure reducing valve according to claim 6, wherein the pressure/flow rate control member is a coil spring.

8. The pressure reducing valve according to claim 6, wherein the spring chamber further comprises a vacuum release member for preventing decrease of mobility of the poppet valve due to a vacuum state.

9. The pressure reducing valve according to claim 8, wherein the vacuum release member is a first communication hole formed in the valve main body positioned in the spring chamber.

10. The pressure reducing valve according to claim 8, wherein the vacuum release member is a second communication hole formed in one end of the poppet valve for communication between the spring chamber and the pressure chamber.

* * * * *